US006916098B2

(12) United States Patent
Salvatori et al.

(10) Patent No.: US 6,916,098 B2
(45) Date of Patent: Jul. 12, 2005

(54) PRESET KEY FOR A PROJECTION DEVICE

(75) Inventors: Phillip H. Salvatori, Salem, OR (US); Randolph W. Nash, Sherwood, OR (US); Thomas A. Andersen, Krakeroy (NO)

(73) Assignee: InFocus Corporation, Wilsonville, OR (US)

( * ) Notice: Subject to any disclaimer, the term of this patent is extended or adjusted under 35 U.S.C. 154(b) by 53 days.

(21) Appl. No.: 10/438,630

(22) Filed: May 14, 2003

(65) Prior Publication Data

US 2004/0227911 A1 Nov. 18, 2004

(51) Int. Cl.[7] .......... G03B 21/00
(52) U.S. Cl. .......... 353/122
(58) Field of Search .......... 353/122; 345/172, 345/730, 732, 761

(56) References Cited

U.S. PATENT DOCUMENTS

| | | | | | |
|---|---|---|---|---|---|
| 5,304,112 | A | | 4/1994 | Mrklas et al. | 600/27 |
| 5,428,417 | A | * | 6/1995 | Lichtenstein | 353/122 |
| 5,526,011 | A | * | 6/1996 | Hix et al. | 345/87 |
| 5,798,818 | A | | 8/1998 | Derderian et al. | 352/31 |
| 5,818,428 | A | | 10/1998 | Eisenbrandt et al. | 345/173 |
| 5,920,361 | A | | 7/1999 | Gibeau et al. | 348/750 |
| 6,005,577 | A | | 12/1999 | Breitlow | 345/352 |
| 6,137,794 | A | | 10/2000 | Brown | 370/360 |
| 6,157,396 | A | | 12/2000 | Margulis et al. | 345/506 |
| 6,345,897 | B1 | * | 2/2002 | Furuhata | 353/122 |
| 6,384,737 | B1 | | 5/2002 | Hsu et al. | 340/825.69 |
| 6,409,350 | B1 | | 6/2002 | Kakimoto et al. | 353/85 |
| 6,540,365 | B1 | * | 4/2003 | Fujiwara et al. | 353/69 |
| 6,558,002 | B1 | * | 5/2003 | Miyashita | 353/42 |
| 6,712,476 | B1 | * | 3/2004 | Ito et al. | 353/122 |

* cited by examiner

*Primary Examiner*—W. B. Perkey
(74) *Attorney, Agent, or Firm*—Alleman Hall McCoy; Russell & Tuttle LLP

(57) ABSTRACT

A method for optimizing an appearance of a projected image. The method includes providing a first configuration having a plurality of preset projection device settings for a first type of projected image and providing a second configuration having a plurality of preset projection device settings for a second type of projected image. The method further includes selecting one of the first configuration and the second configuration, and automatically adjusting the respective plurality of preset projection device settings in accordance with the selection of one of the first configuration and the second configuration.

24 Claims, 2 Drawing Sheets

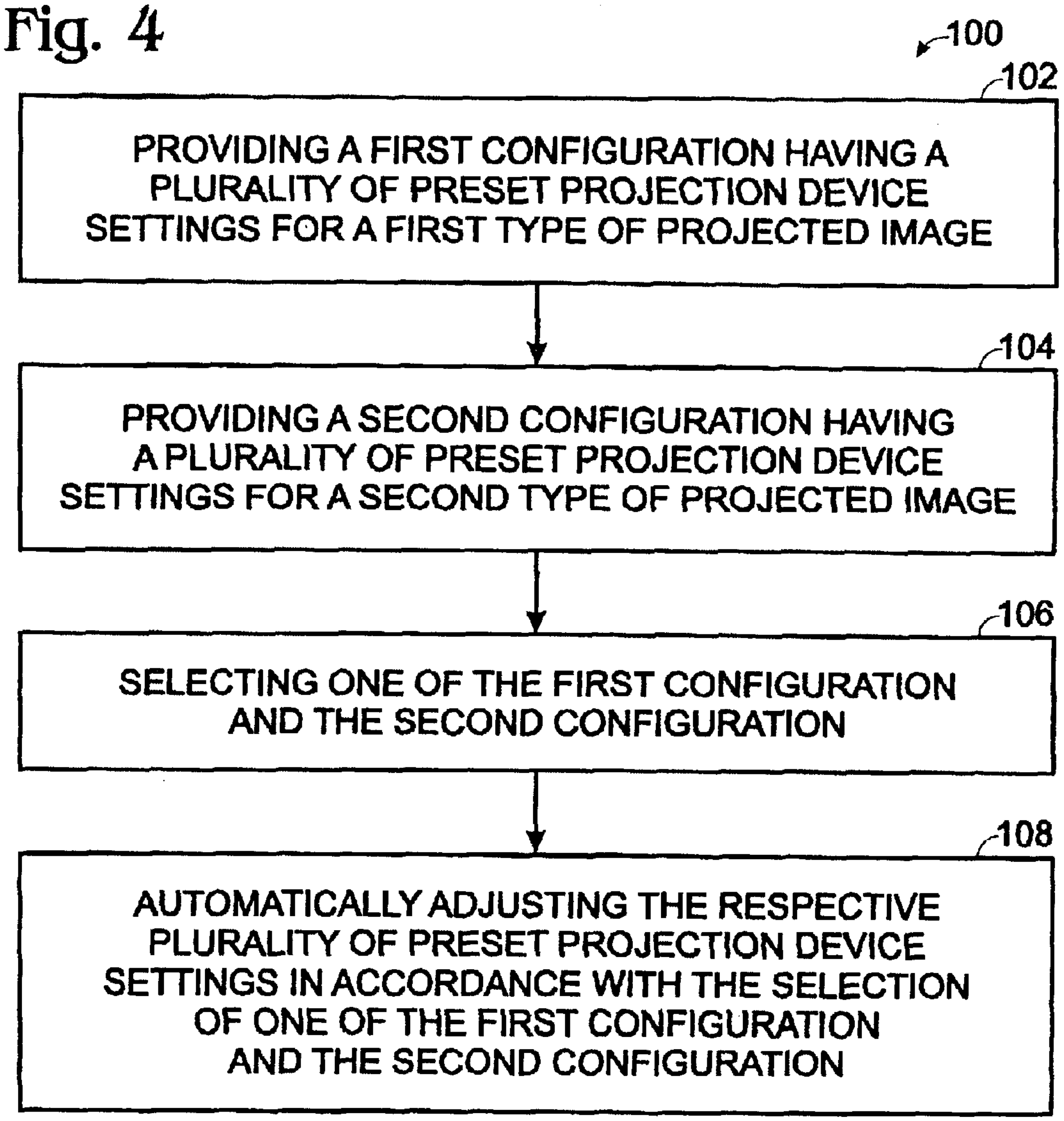
Fig. 4
100
102
PROVIDING A FIRST CONFIGURATION HAVING A PLURALITY OF PRESET PROJECTION DEVICE SETTINGS FOR A FIRST TYPE OF PROJECTED IMAGE
104
PROVIDING A SECOND CONFIGURATION HAVING A PLURALITY OF PRESET PROJECTION DEVICE SETTINGS FOR A SECOND TYPE OF PROJECTED IMAGE
106
SELECTING ONE OF THE FIRST CONFIGURATION AND THE SECOND CONFIGURATION
108
AUTOMATICALLY ADJUSTING THE RESPECTIVE PLURALITY OF PRESET PROJECTION DEVICE SETTINGS IN ACCORDANCE WITH THE SELECTION OF ONE OF THE FIRST CONFIGURATION AND THE SECOND CONFIGURATION

PRESET KEY FOR A PROJECTION DEVICE

TECHNICAL FIELD

The present invention relates generally to projection devices. More specifically, the present invention relates to user-inputs for optimizing the appearance of a projected image.

BACKGROUND

Projection devices may receive input from a number of different sources including video sources, computers, personal data assistants (PDAs), cameras, video-imaging devices, etc. Images from these sources, including, but not limited to, video images, photographs, presentations, documents, films, etc., may be projected by the projection device as projected images. Optimization of the appearance of the projected images may require adjustment of a number of projection device settings. The adjustment of the projection device to optimize the projected image, depending on the type of image, and the source of the image, may be difficult and time-consuming, as a user may be required to access individual settings via one or more menu systems and/or make manual adjustments to the projection device.

It would be desirable to provide the user with an easily accessible user-input which would allow the user to quickly and easily switch from a first pre-defined configuration to a second pre-defined configuration. Likewise, it would be desirable to allow the user to customize one or more of the pre-defined setting configurations.

SUMMARY

A method for optimizing an appearance of a projected image. The method includes providing a first configuration having a plurality of preset projection device settings for a first type of projected image, and providing a second configuration having a plurality of preset projection device settings for a second type of projected image. The method further includes selecting one of the first configuration and the second configuration, and automatically adjusting the respective plurality of preset projection device settings in accordance with the selection of one of the first configuration and the second configuration.

BRIEF DESCRIPTION OF THE DRAWINGS

FIG. 4 is a flow diagram of a method for optimizing an appearance of a projected image according to an embodiment of the present invention.

DETAILED DESCRIPTION

Figure 1:
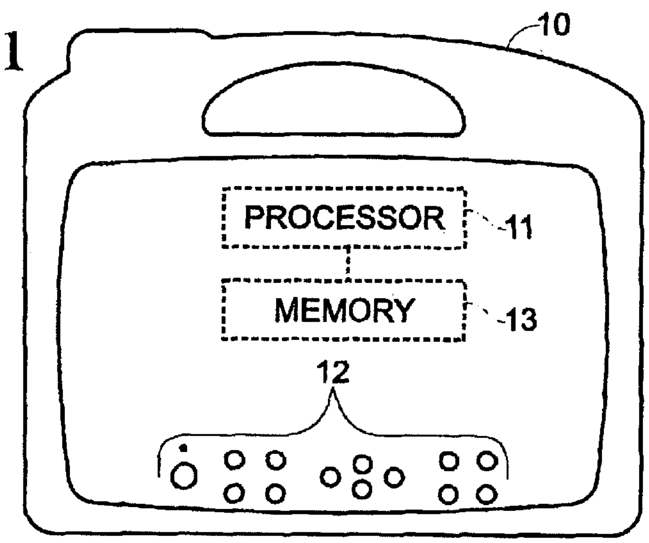
FIG. 1 depicts a projection device including various user inputs according to an embodiment of the present invention.

FIG. 1 depicts a projection device 10 including a plurality of user inputs 12. As used herein, a projection or image-generating device may include any suitable display device or image projector, including, but not limited to, a digital projector, a liquid crystal display (LCD) projector, a digital light processing projector, etc.

User inputs 12 are typically adapted to allow a user to operate a projection device, such as by enabling a user to turn the projection device on and off, alter and/or select various settings, navigate menu systems, etc. The user inputs may be located on the body of the projection device, as shown in FIG. 1. Alternatively, or additionally, the user inputs may be located remotely, i.e., on a remote control, portable computing device, or the like.

A simplified block diagram of a projection device according to an embodiment of the present invention is shown in dashed lines in FIG. 1. The projection device, in its most basic form, includes a processor 11 and memory 13. Although shown as resident on the projection device, it should be appreciated that the processor and memory described above may be resident on a linked computing device, such as a computer, portable computer, portable data assistant, server, camera, control unit, etc.

Processor 11 may take the form of a central processing unit (CPU), or other suitable controller for controlling operation of the projection device. Processor 11 thus may be configured to manage operation and function of the projection device. For example, processor 11 may manage operational programs, menu programs, user-interface programs, etc.

Memory 13 may include both volatile memory and non-volatile memory. Non-volatile memory may be utilized to store permanent or semi-permanent data. Such non-volatile memory may be any suitable type of non-volatile memory, including, but not limited to, ROM, PROM, EPROM, EEPROM and Flash memory, and combinations thereof. Volatile memory may be utilized to store temporary data, including images and instructions. Volatile memory may include one or more suitable types of volatile memory, such as SRAM or DRAM.

As described in more detail below, memory 13 of projection device 10 may be configured to store one or more user-selected or manufacturer-selected projection device configurations. Each projection device configuration (or configurations), as used herein, typically includes a plurality of preset projection device settings. A selected configuration may optimize the projection device's settings for a specific type of projected image. Optimize, as used herein, may be an objective optimization or a subjective optimization. For example, a presentation configuration may include preset projection device settings that are optimized for display of presentations. Likewise, a photograph configuration may include settings that are optimized for display of photographs, a film configuration may include settings that are optimized for display of film, a video configuration may include settings that are optimized for display of video, etc. Moreover, a user may generate a configuration with customized settings for the user, such customized settings may be understood to optimize the projected image to the user's desires.

A user may access any one of the stored configurations via processor 11. Upon selection of a particular configuration, the processor may automatically adjust the setting of the projection device to the associated preset projection device settings in accordance with the selected configuration. Thus, a user may easily switch between different configurations as desired. Moreover, a user does not manually have to adjust individual settings when the image source is changed.

As described above, projection device 10 typically includes a plurality of projection device settings that may be selected and preset with other settings to create a configuration. Examples of such settings will be described in greater detail below. It should be appreciated that these examples are intended for illustrative purposes and not as a limitation.

Thus, different settings and/or combinations of settings may be included on the projection device without departing from the scope of the invention. The settings enable a user to alter the parameters of the projection device in order to better suit the type of projected image and/or the needs, or desires of a user.

Examples of adjustable settings or features that might be included in a projection device include: keystone, contrast, brightness, color, tint, aspect ratio, sharpness, color space, color temperature, overscan, phase, tracking, horizontal position and vertical position. It will be appreciated that projection device 10 may include some, none, or all of the adjustable settings described in the present application and may include additional or alternative settings not described herein.

As stated above, projection device 10 may include an adjustable keystone setting. Typically the keystone setting is altered to compensate for an image that is skewed as a result of the angle of projection from the projection device onto a viewing surface. For example, when an image is projected onto a viewing screen, wall, or other projection surface, the projected image may appear wider at the top and narrower at the bottom. By altering the keystone setting, a user can adjust the projected image to more accurately resemble the original image.

In one embodiment, the user may select a desired level of keystone, by selecting a keystone number (for example) between 1 and 100. In such an embodiment, decreasing the keystone number may incrementally decrease the width of the bottom of the image, while increasing the keystone number may incrementally decrease the width of the top of the image.

Projection device 10 also may include an adjustable contrast setting. Altering the contrast setting typically results in an adjustment of the degree of difference between the lightest and darkest parts of a projected image, thus changing the amount of black and white in a projected image. In one embodiment, the user may be presented with a contrast number (for example), selectable between 1 and 100. Decreasing the contrast number may incrementally decrease the degree of contrast, while increasing the contrast number may incrementally increase the degree of contrast.

Another adjustable setting that may be used to affect the projected image is a brightness setting. Altering the brightness setting typically changes the intensity of a projected image. In one embodiment, the user may be presented with a brightness number, selectable between 1 and 100, for example. Decreasing the brightness number may incrementally decrease the intensity of a projected image, while increasing the brightness number may incrementally increase the intensity of a projected image.

Similarly, another adjustable setting that may be used to affect the projected image is a color setting. Altering the color setting typically adjusts a projected image, such as a video image, from black and white to fully saturated color. In one embodiment, the user may be presented with a color saturation number (for example), selectable between 1 and 100. Decreasing the color saturation number may incrementally decrease the degree of color saturation of the projected image until the projected image is entirely black and white, while increasing the color saturation number may incrementally increase the degree of color saturation of the projected image until the projected image is fully saturated in color.

Another typical setting is the tint setting. Altering the tint setting typically adjusts the red-green color balance in a projected image. In one embodiment, the user may be presented with a tint number, selectable between 1 and 100, for example. Decreasing the tint number may incrementally adjust the red-green color balance towards red, while increasing the tint number may incrementally adjust the red-green color balance towards green.

A user may further be able to adjust the aspect ratio of a projected image. Altering the aspect ratio of a projected image typically changes the ratio of the projected image's width to the projected image's height. In one embodiment, the user may be presented with several aspect ratios from which to select. These ratios may be specific to a type of image or image source. For example, and not as a limitation, a user may select an aspect ratio of 4:3, the standard aspect ratio for TV screens, or 16:9, the standard aspect ratio for High Definition Television (HDTV) and most Digital Versatile Discs (DVDs).

The sharpness of the projected image may also be adjustable. Altering the sharpness setting typically changes the clarity of the edges of a projected image. In one embodiment, the user may be presented with several options relating to the level of sharpness, such as: sharpest, sharper, standard, softer, and softest.

In some embodiments, a user may be able to select or adjust the color standard. For example, a color space setting may allow a user to select from an automatic mode or manual mode. In an automatic mode, projection device automatically determines the color standard for the input source. In a manual mode, a user selects a desired color setting. The selectable options may include various different color standard settings, such as RGB, SMPTE240, REC709 or REC 601.

A user may also select or adjust the color temperature. A color temperature setting typically allows the user to change the intensity of the colors in the projected image. In some embodiments, the user may be presented with various options from which to select. These options may include 6500K, 7200K, and 9300K. Other embodiments may include selectable options such as coolest, cooler, cool, warm, warmer, warmest. Alternatively, or additionally, the user may be able to adjust the intensity of each of the red, green, and blue colors by selecting a red, green, or blue grain number on a scale from 1 to 100.

A video standard setting may be provided which may allow a user to select from various video standards. The available video standards may include, for example, National Television System Committee (NTSC), Phase Alternating Line (PAL), or Sequential Couleur Avec Memoire or Sequential Color with Memory (SECAM).

Another adjustable setting that may be available is an overscan setting. Adjusting the overscan setting typically removes noise around the video image. In some embodiments, this may be presented as a setting which can be selectively turned on or off.

Another available setting may be a phase setting. Altering a phase setting typically results in the adjustment of the horizontal phase of a computer source image. In one embodiment, the user may be presented with a phase number, selectable between 1 and 100, for example. Decreasing the phase number may incrementally decrease the horizontal phase of the computer source, while increasing the number may incrementally increase the horizontal phase of the computer source.

Similarly, altering a tracking setting adjusts the horizontal clocking of a computer source image. In one embodiment, the user may be presented with a tracking number, selectable between 1 and 100, for example. Decreasing the tracking number may incrementally decrease the horizontal clocking of the computer source, while increasing the number may incrementally increase the horizontal clocking of the computer source.

A horizontal position setting may allow a user to adjust the horizontal position of a projected image. In one embodiment, the user may be presented with a horizontal position number, selectable between 1 and 100, for example. For example, decreasing the horizontal position number may incrementally move the projected image towards the left side of the viewing surface, while increasing the horizontal position number may incrementally move the projected image towards the right side of the viewing surface.

Likewise, a vertical position setting may allow a user to adjust the vertical position of a projected image. In one embodiment, the user may be presented with a vertical position number, selectable between 1 and 100, for example. For example, decreasing the vertical position number may incrementally move the projected image towards the bottom of the viewing surface, while increasing the vertical position number may incrementally move the projected image towards the top of the viewing surface.

In some embodiments, the projection device may further include various adjustable audio settings including, but not limited, to balance and volume level. Moreover, the user may be able to turn on or off audio settings such as audible reminders or cues.

It will be appreciated that not all settings may be available under all conditions. For example, the sharpness and overscan settings may be applicable only to video sources, while the color space and color temperature features may be available to both video and computer sources.

It will be appreciated that some or all of the adjustable settings may be presented to the user via a series of user inputs such as buttons, knobs, dials, or the like. These user inputs may then be adjusted manually to achieve the desired result.

Alternatively or additionally, the user inputs may be in the form of selectable menus. As described above, the projection device may include a processor or processing device adapted to run an application program. The application program may be adapted to present the user with a user-interface, such as a menu cascade. The user may then adjust the settings for the adjustable features by accessing and navigating the menu cascade. An exemplary menu cascade is described in co-pending U.S. patent application Ser. No. 10/439,008, filed May 14, 2003, of Phillip H. Salvatori et al., entitled METHOD FOR MENU NAVIGATION, the entire disclosure of which is hereby incorporated by reference for all purposes.

The user-interface may be viewed by the user as an image projected on a viewing surface by the projection device. Alternatively, the user may view the user-interface on a separate display. For example, the use may view the user-interface on a display such as those described in co-pending U.S. patent application Ser. No. 10/438,612, filed May 14, 2003, for Phillip H. Salvatori et al., entitled USER-INTERFACE FOR A PROJECTION DEVICE, the entire disclosure of which is hereby incorporated by reference for all purposes.

Figure 2:
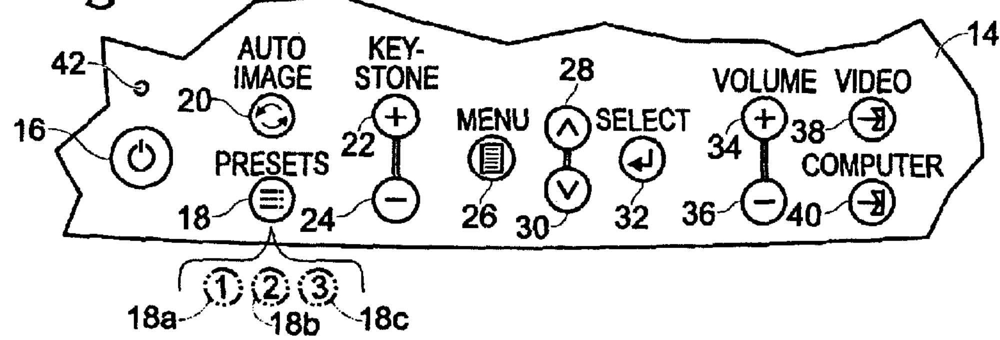
FIG. 2 is a close-up view of exemplary user-inputs for the projection device shown in FIG. 1.

FIG. 2 depicts an exemplary user input layout 14 that might be appropriate for use with the projection device of FIG. 1. Without wishing to be limited, the user input layout may include, one or more of the following user inputs, a power button 16, a preset (or presets) button 18, an auto image button 20, keystone setting buttons 22 and 24, menu button 26, navigation buttons 28 and 30, select button 32, volume setting buttons 34 and 36, video button 38, and computer button 40.

Power button 16 is typically used to turn projection device 10 on and off. An indicator light 42 may be located near power button 16 so that a user may determine whether the projection device is on or off by looking at the light.

As described in more detail below, preset button 18 may enable a user to select a desired configuration composed of a plurality of preset settings. The preset button may enable a user to select a desired configuration, and thus the plurality of settings, without having to manually select and adjust individual settings.

Preset button 18 may allow a user to cycle through a number of pre-defined setting configurations. Thus, a single preset button may be used to allow a user to toggle between various configurations by repeated activation of the single preset button. Moreover, the preset button may link a user to a menu, which enables a user to select any one of a number of different configurations.

It will be appreciated that in some embodiments, projection device 10 may include more than one preset button. For example, projection device 10 may include several preset buttons **18*a*, 18*b*, 18*c*, with each button being associated with a specific setting configuration. For example, preset button 1, indicated at 18*a*, may enable selection of a first configuration with a first set of preset settings. Similarly, preset button 2, indicated at 18*b*, may enable selection of a second configuration with a second set of preset settings. Likewise, preset button 3, indicated at 18*c*, may enable selection of a third configuration with a third set of preset settings. The configurations may be any pre-selected (manufacturer or user) configurations, including, but not limited to presentation configurations with settings optimized for presentations, photograph configurations with setting optimized for photographs, film configurations with settings optimized for film, video configurations with settings optimized for video, and user-defined configurations with settings selected by a user. For example, preset button 1 may be set as a presentation configuration, preset button 2 may be set as a film configuration, and preset button 3** may be set as a user-defined configuration.

It should be appreciated that although only three preset configurations are illustrated in FIG. 2, there may be any number of configurations, configuration buttons, etc.

Other controls may be present on user input layout 14. For example, an auto image button 20 may be provided. The auto image button may be used to reset the projection device to the image source.

Keystone settings may also be provided in some embodiments. The keystone setting buttons 22 and 24 typically allow the user to adjust the squareness of the projected image. As described above, an image may appear to be distorted when projected onto a viewing surface. Activation of keystone setting buttons 22 and 24 allows a user to compensate for any such distortion.

As described above, projection device 10 may be adapted to communicate with the user via a menu system. The menu button 26 may allow the user to access the menu system. A suitable menu system is described in co-pending U.S. patent application Ser. No. 10/439,008, filed May 14, 2003, for Phillip H. Salvatori et al., entitled METHOD FOR MENU NAVIGATION, the disclosure of which is incorporated by reference above.

Navigation buttons 28 and 30 may be provided on the user input layout 14. Such navigation buttons may allow the user to navigate and adjust settings in the menus. Moreover a select button 32 may enable a user to confirm selection of a desired setting.

Volume setting buttons may also be provided. Volume setting buttons 34 and 36 may enable the user to adjust the volume. The video input button 38 may allow the user to change the active video source, while the computer input button 40 may allow the user to change the active computer source.

As shown, each of the above-described buttons may include or display indicia related to the function of the button. Moreover, the buttons may be shaped and/or grouped according to function and ease of use. For example, in the embodiment depicted in FIG. 2, the buttons are grouped by context of use into three categories such as set-up, menu navigation, and presentation. Such groupings may provide ease of use in accessing images, projecting images and operating the projection device. Of the above-described user-inputs, the set-up category may include, for example, auto image button 20, preset button 18, and keystone buttons 22 and 24. The menu navigation category may include, for example, menu button 26, menu navigation buttons 28 and 30, and select button 32. The presentation category may include, for example, volume setting buttons 34 and 36, video button 38, and computer button 40.

As described above, preset key 18 enables the user to cycle through a number of pre-defined setting configurations. For example, a particular projection device may include configurations that optimize the projection device settings for various input sources including, but not limited to, presentation sources, photograph sources, film image sources, such as film cameras, video image sources, such as video cameras, and audio sources. Because each of these different sources present different types of images (i.e., digital, analog, high resolution, low resolution, etc.), adjusting and saving settings for these sources as a configuration may enable optimization of the projected image without requiring a user to constantly readjust the settings for each source.

According to one embodiment of the invention, the projection device may be pre-loaded with manufacturer-defined and/or default configurations. These manufacturer-defined configurations and/or default configurations may be accessible via the preset key. Additionally, in some embodiments, the user may create a customized configuration with user-selected settings. For example, a user may use one of the manufacturer-defined configurations as a starting point, and then adjust various settings, as desired, to create a user-defined configuration, which also may be accessible via the preset key. Similarly, a user in creating a customized configuration may use a default setting within a manufacturer configuration as a starting point, and then adjust the various settings, as desired, to create one or more user-defined configuration, which may be accessible via the preset key. Moreover, in some embodiments, additional configurations (with preset settings) may be loaded onto the projection device or a linked controlling device.

For purposes of illustration, a first configuration (manufacturer-defined or user-defined) may include the following settings: the keystone, contrast, brightness, color, tint, phase, tracking, horizontal position and vertical position settings to 50 on a scale of 1–100, the aspect ratio setting at 4:3, the sharpness setting to standard, the color space setting to RGB, the color temperature setting to 9300K, the video standard setting to NTSC, and the overscan setting turned off. Selection of the first configuration, results in the automatic adjustment to the above-preset settings.

Continuing with the above-example, a user may modify the first configuration by modifying one or more of the preset settings. For example, the user may find that the projected image is enhanced for "lower quality" images when the contrast setting is adjusted to 40, the brightness setting is adjusted to 70, and the tint setting is adjusted to 30. The user may then save these settings as a second (user-defined) configuration. Later selection of the second configuration results in the automatic adjustment to the altered settings. Thus, instead of having to manually adjust the contrast, brightness, and tint setting each time a "lower quality" image is displayed, the user can quickly and easily activate preset button 20 and switch from the first configuration to the second configuration, as needed or desired. Of course, it will be appreciated that the configurations need not be altered solely to compensate for lower quality, but may be adjusted for any reason including, but not limited to, higher or lower quality, different sources, clarity, and/or aesthetic sensibility.

Figure 3:
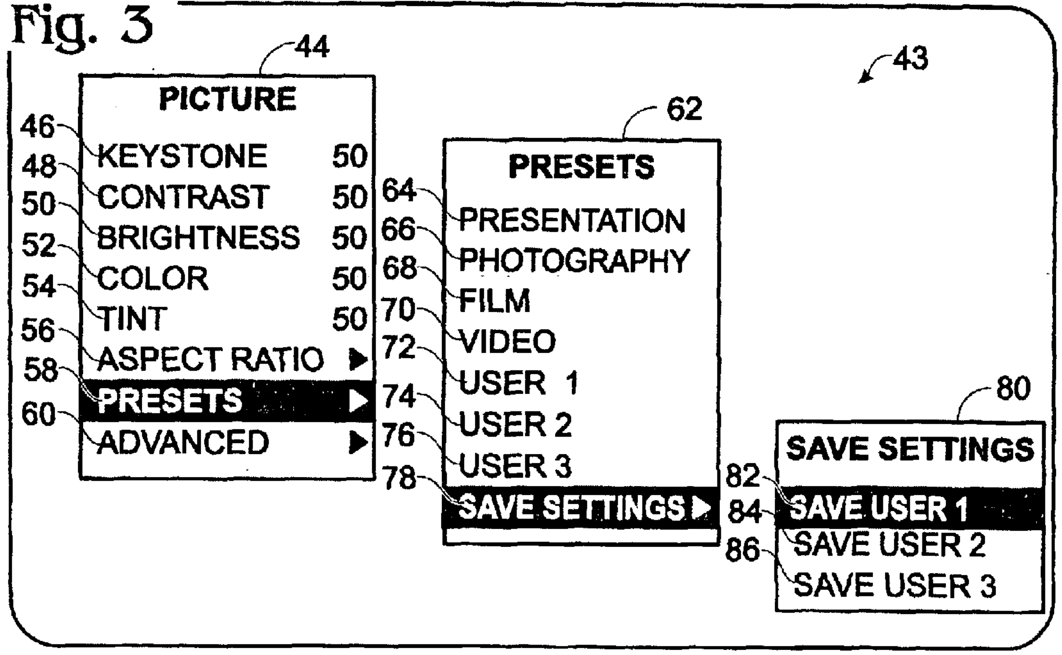
FIG. 3 depicts an exemplary menu system suitable for use with the projection device shown in FIG. 1.

FIG. 3 depicts an exemplary menu cascade 43 that might be encountered by a user as he or she accesses and optionally customizes and/or selects a preset configuration. Menu 44 presents various alterable settings including: keystone setting 46, contrast setting 48, brightness setting 50, color setting 52, tint setting 54, aspect ratio setting 56, presets settings 58, and advanced settings 60.

Upon accessing Presets menu 62, the user is presented with a list of manufacturer-defined configurations including: presentation configuration 64, photography configuration 66, film configuration 68 and video configuration 70. As shown, presets menu 62 may also include user-definable configurations, such as those shown at 72, 74, and 76. It will be appreciated that projection device 10 may include a smaller or greater number of manufacturer-defined configurations and a smaller or greater number of user-definable configurations than that shown in FIG. 3.

In one embodiment, if a user desires to alter a manufacturer-defined configuration or a previously set user-configuration, the user may adjust the settings as desired and then select the "Save Settings" option (shown at 78 on presets menu 62) in order to access menu 80. The user may then select to save as user 1 (at 82), save user 2 (at 84) or save user 3 (at 86), in order to save the user-defined settings under the user 1 configuration, user 2 configuration, or user 3 configuration, respectively.

Once the preset configurations are defined, the user may access the configurations through the menu, as shown in FIG. 3. Alternatively, as described above, the user may access the preset configurations directly via preset key 18. This direct access to the preset configurations may be particularly desirable in those circumstances where the menu must be projected by the projection device in order for the menu to be viewed by the user.

A method according to one embodiment of the present invention is shown generally at 100. The method includes, at 102, providing a first configuration having a plurality of preset projection device settings for a first type of projected image. At 104, the method includes providing a second configuration having a plurality of preset projection device settings for a second type of projected image. At 106, the method includes selecting one of the first configuration and the second configuration and receiving the selection thereof. The method further may include, at 108, automatically adjusting the respective plurality of preset projection device settings in accordance with the selection of one of the first configuration and the second configuration.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

The following claims particularly point out certain combinations and subcombinations regarded as novel and nonobvious, and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method for optimizing an appearance of a type of projected image, the method comprising:

providing a digital projection device configured to project a first type of projected image and a second type of projected image;

providing a first configuration having a plurality of preset projection device settings for the first type of projected image;

providing a second configuration having a plurality of preset projection device settings for the second type of projected image;

receiving a user selection of one of the first configuration and the second configuration;

automatically adjusting the respective plurality of preset projection device settings in accordance with the selection of one of the first configuration and the second configuration, to thereby adjust an appearance of the projected image.

2. The method of claim 1, wherein at least one of the first configuration and second configuration is a manufacturer-defined configuration.

3. The method of claim 2, wherein the manufacturer-defined configuration is one of a presentation configuration, a photography configuration, a film configuration, and a video configuration.

4. The method of claim 1, wherein at least one of the first configuration and second configuration is a user-defined configuration.

5. The method of claim 4, wherein the user-defined configuration includes at least one user-adjusted projection device setting.

6. The method of claim 1, wherein providing a second configuration includes receiving a selection of at least one projection device setting and saving the selection of the at least one projection device setting as a second configuration.

7. The method of claim 1, wherein at least one of the first configuration and the second configuration is a default configuration where each of the preset settings is a default setting.

8. A projection device configured to display a first and second type of projected image comprising:

a first user-selectable configuration having a plurality of preset projection device settings for the first type of projected image, the first user-selectable configuration stored in memory;

a second user-selectable configuration having a plurality of preset projection device settings for the second type of projected image, the second user-selectable configuration stored in memory;

a processor linked to the memory and configured to automatically adjust the respective plurality of preset projection device settings in accordance with selection of one of the first configuration and the second configuration.

9. The projection device of claim 8, wherein at least one of the first configuration and second configuration is a manufacturer-defined configuration.

10. The projection device of claim 9, wherein the manufacturer-defined configuration is one of a presentation configuration with settings optimized for presentations, a photograph configuration with settings optimized for photographs, a film configuration with settings optimized for film, and a video configuration with settings optimized for video.

11. The projection device of claim 8, wherein at least one of the first configuration and the second configuration is a user-defined configuration.

12. The projection device of claim 8, wherein at least one of the first user-selectable configuration and the second user-selectable configuration includes at least one setting adjusted by a user.

13. A method for simultaneously adjusting settings for a plurality of adjustable features on a projection device configured to display a plurality of image types, the method comprising:

presenting a plurality of adjustable settings;

adjusting one or more of the adjustable settings to create a first configuration;

associating the first configuration with a first type of projected image; and saving the first configuration so that the adjustable settings are adjusted in accordance with the first configuration upon receiving a user input.

14. The method of claim 13, further comprising creating a second configuration by altering some or all of the settings from the first configuration.

15. The method of claim 14, further comprising the step of saving the second configuration so that repeated activation of the user input will cause the adjustable features to toggle between the first configuration and second configuration.

16. The method of claim 13, wherein the adjustable settings are presented via a menu.

17. A projection device configured to display a plurality of image types, the projection device comprising:

a plurality of adjustable settings;

means for altering the values of one or more of the adjustable settings;

means for saving the one or more altered values for the adjustable settings as a first configuration, the first configuration being associated with a type of projected image; and means for simultaneously altering the settings of the adjustable features to adopt the first configuration.

18. The projection device of claim 17, further comprising:

means for altering the settings of one or more of the adjustable features from the first configuration to a second configuration.

19. A method for accessing customized settings for a projection device configured to display a plurality of image types, the method comprising:

selecting a plurality of first projection device settings;

saving the plurality of settings as a first configuration for a type of projected image; and accessing the first configuration upon receiving a user-input.

20. The method of claim 19, further comprising:

selecting a plurality of second projection device settings:

saving the plurality of settings as a second configuration; and accessing the second configuration upon receiving a user-input.

21. The method of claim 19, wherein the user-input is a button.

22. A program storage device readable by a machine, the storage device tangibly embodying a program of instructions executable by the machine to perform a method for optimizing an appearance of a type of projected image, the method comprising:

providing a digital projection device configured to project a first type of projected image and a second type of projected image;

providing a first configuration having a plurality of preset projection device settings for the first type of projected image;

providing a second configuration having a plurality of preset projection device settings for the second type of projected image; and receiving a user selection of one of the first configuration and the second configuration; and automatically adjusting the respective plurality of preset projection device settings in accordance with the selection of one of the first configuration and the second configuration, to thereby adjust an appearance of the projected image.

23. The method of claim 1, wherein a user input device for selecting the first configuration and the second configuration is located on the projection device.

24. The projection device of claim 8, wherein the user-selectable configuration is located on the projection device.

* * * * *